United States Patent [19]
Bengtson

[11] 4,108,356
[45] Aug. 22, 1978

[54] SCHEDULING TOOL

[75] Inventor: Robert W. Bengtson, Succasunna, N.J.

[73] Assignee: Foster Wheeler Energy Corporation, Livingston, N.J.

[21] Appl. No.: 741,930

[22] Filed: Oct. 26, 1976

Related U.S. Application Data

[62] Division of Ser. No. 562,606, Mar. 27, 1975, Pat. No. 4,006,345.

[51] Int. Cl.² .................. G06C 27/00; G09F 3/18; G09B 19/18; G09F 5/00
[52] U.S. Cl. .................... 235/69; 35/24 R; 40/19.5; 116/135; 235/89 R
[58] Field of Search .................. 235/69, 89 R, 85; 116/135, 136, 130; 35/24 R, 24 A; 40/19.5

[56] References Cited

U.S. PATENT DOCUMENTS

| | | | |
|---|---|---|---|
| 2,787,850 | 4/1957 | Ware, Jr. | 116/135 |
| 3,290,797 | 12/1966 | Opel | 35/24 A |
| 3,720,009 | 3/1973 | Hutar | 35/24 R |

Primary Examiner—Stephen J. Tomsky
Attorney, Agent, or Firm—Marvin A. Naigur; John E. Wilson

[57] ABSTRACT

A scheduling tool for establishing estimated duration of a contractual obligation involving multiple phases and associated functions thereof is utilized with a normalized scale and various overlays determined in accordance with statistical information relative to criteria useful in determining the duration of the obligation. A manpower allocation device may be used alone or in conjunction with the scheduling tool to estimate the manpower necessary during various phases of different contractual obligations.

8 Claims, 10 Drawing Figures

FIG. 6
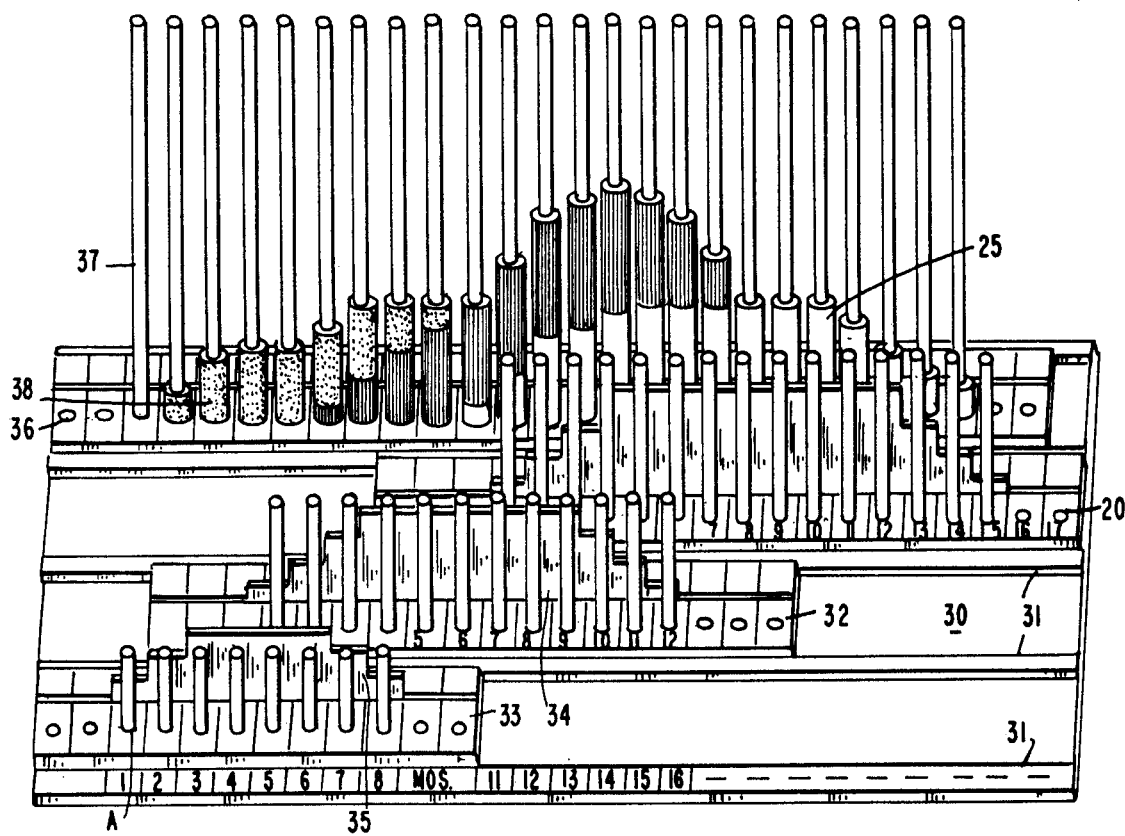
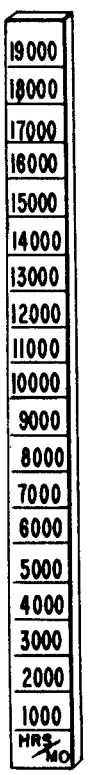
FIG. 7A
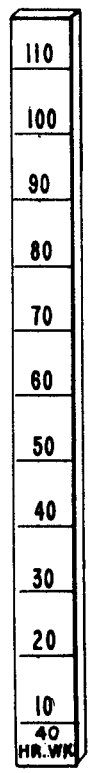
FIG. 7B
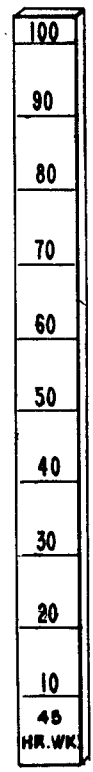
FIG. 7C
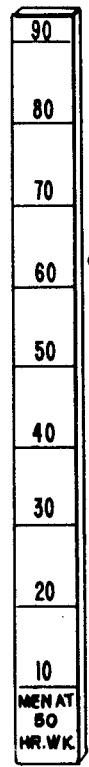
FIG. 7D

SCHEDULING TOOL

This is a division of application Ser. No. 562,606, filed Mar. 27, 1975 now U.S. Pat. No. 4,006,345.

BACKGROUND OF THE INVENTION

The present invention deals with a system for quickly providing an estimated schedule for a particular contractual obligation. For example, construction contracts involving engineering, drafting, and equipment procurement. Further, the invention relates to a system for allocating manpower for each of the individual phases of the obligation, as well as overlapping phases of different contractual obligations.

The use of computers in scheduling complex and long-term construction obligations as well as manpower allocation has been utilized quite effectively by many organizations. The present invention is not intended to usurp computer functions; however, it has been found that the use of computers may be far more complicated a procedure than is necessary for certain aspects of scheduling. For example, if certain criteria are known to be effective as estimators for time and man-hour requirements for a particular job and such criteria are fairly linear over a wide range; then a rough idea for long-term scheduling can be determined with knowledge of one or two criteria, at least in the initial phases of the scheduling of the particular contractual obligation. Furthermore, if a customer requires information as to the estimated time of completion, barring unforeseen difficulties, a fairly accurate estimation can be presented so that the customer can evaluate this relative to the particular needs at that time. In addition to the foregoing, it is necessary for the contractor to allocate and project further manpower needs. By knowing what such demands will be in the future, preparation for the eventual increase or decrease in manpower can be more easily accomplished. Further, the unnecessary hiring or termination of employees is reduced significantly.

Since many of the contractual obligations involved in large construction contracts are protracted over many months and years, in certain cases computerization of the contractual and manpower allocations has become necessary. However, for certain purposes a computer print-out may be somewhat cumbersome. The present system has been developed to supplement the excellent scheduling capabilities of computer technology over a long term and provide a simple bar graph arrangement so that a rough idea of future scheduling may be anticipated, while the computer is used to solve the individual problems of scheduling.

SUMMARY OF THE INVENTION

There has been provided a scheduling tool for establishing the duration of a contractual obligation involving multiple phases and associated functions thereof, wherein normalized scheduling means represents the various phases of operation in percentum, beginning and ending at selected percentum intervals relative to the entire contractual obligation. A plurality of overlay means converts each of the phases of the normalized scheduling means to real time intervals, and statistical chart means provides a selection indication as to which of said overlay means should be utilized for conversion of the phases into the selected duration corresponding to real time in accordance with criteria established by a statistical basis of said statistical chart means.

In accordance with another aspect of the present invention, the scheduling tool establishes an allocation of manpower over a selected period of time in accordance with a statistically established period of completion for each of the plurality of contractual obligations contemplated. Chart means establishes beginning and ending times of the obligation, which beginnings and endings are established statistically for each of the plurality of obligations. Each of the chart means allocates man-hours in real time for each of a plurality of time units over the entire obligation. Unit measuring means corresponding to each man-hour per unit time interval is located in correspondence with each of the charts. Alignment means receives the chart means and units means in an array corresponding to the particular beginning and ending of each obligation in correspondence with actual or anticipated beginning and ending times such that each obligation is located in a real-time interval of an overall work schedule. Locating means receives the units measuring means once located in time by the alignment means such that a total of man-hours for all of said contractual obligations for each time interval is established whereby the total man-hour requirements for each time interval is readily perceived by an inspection of the magnitude of the total of the unit measuring means for each time interval received by the locating means.

For a further understanding of the present invention together with other and further objects thereof, reference is directed to the following description taken in connection with the accompanying drawings, while the scope will be pointed out in the appended claims.

DESCRIPTION OF THE DRAWINGS

FIG. 6 is an illustration of the combination of different elements as are illustrated in FIG. 5 with an overall allocation of man-hours incorporated therein.

FIG. 7A–7D are illustrations of scale devices used in connection with the present invention.

DESCRIPTION OF THE PREFERRED EMBODIMENT

Figure 1:
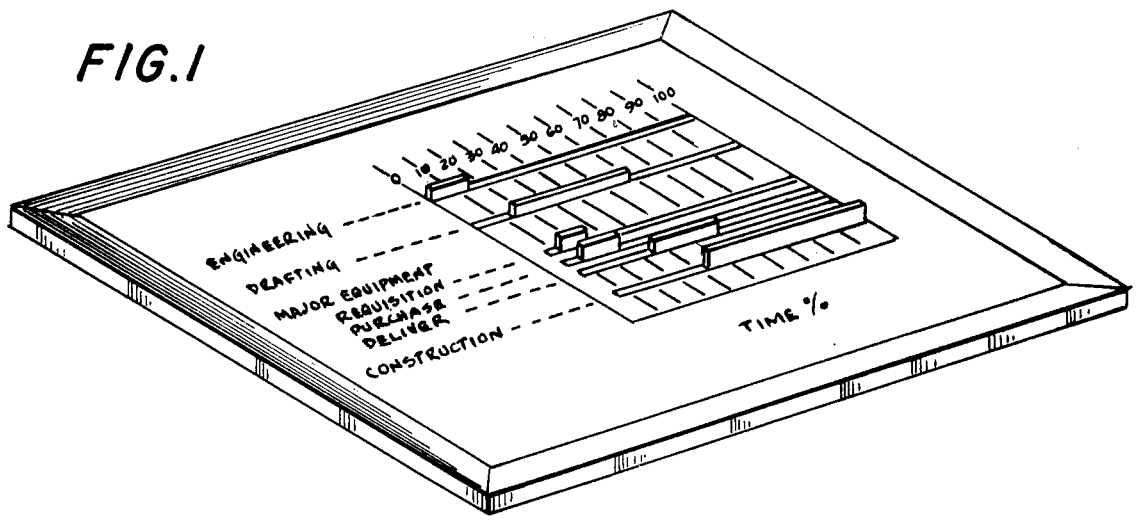
FIG. 1 is an illustration of the normalized scheduling means for an individual contractual obligation.

In FIG. 1 there is illustrated a scheduling tool according to an embodiment of the present invention wherein the abscissa represents time in percentum normalized as an individual contractual obligation, and the ordinate represents different phases of the particular contractual obligation such as engineering, drafting, major equipment procurement, and construction. Other aspects may also be included, but the ones included are examples of typical construction contracts.

In FIG. 1 the time is normalized, that is, the units are in percentum and must be converted to real time in order to determine estimated intervals for each of the processes involved in providing the contractual services required. For example, the engineering phase is the initial portion of an obligation which requires the development or modification of processes required for the particular job involved.

The engineering phase beginning at time zero, continues to about 15 on the time scale, meaning that the engineering portion of the contract occurs during the first 15 percent of the overall time necessary to complete the job. This does not mean that 15 percent of all the time available for the job is allocated to engineering, it merely means that in the time allocated for the entire job of engineering occurs during the first 15 percent thereof. It can be seen in FIG. 1 that major equipment procurement phase is begun during the latter part of the engineering interval i.e. at approximately time percent 10. In this example during that period of time representing between the first 10 and 20 percent of the overall contractual obligation major equipment is requisitioned. The actual man-hour requirements and time interval varies for each phase of the obligation, the periods being determined statistically for each organization.

Other aspects of the scheduling are illustrated in FIG. 1. For example, drafting begins at approximately a time representing 15 percent of the elapsed time in the job and continues until about the 60 percent mark. Construction begins at about the 40 percent interval and continues to the end. These various phases understandably overlap each other. For example, the delivery of major equipment begins very shortly before commencement of actual construction and continues for a period during the initial phases thereof. After delivery of all the equipment, construction continues to completion.

Figure 2:
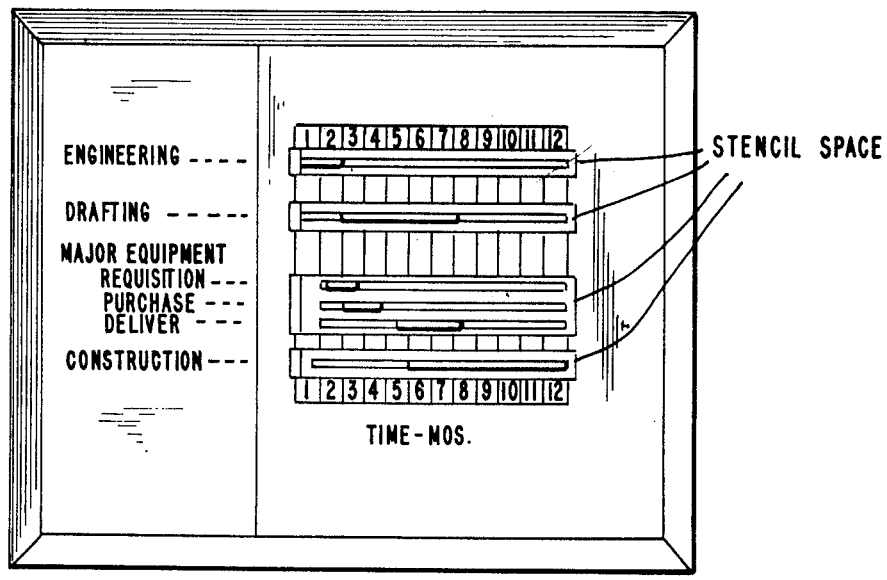
FIG. 2 is an illustration of the scheduling means of FIG. 1 with an overlay converting the normalized chart into a real-time interval.

In FIG. 2 a real time overlay is shown wherein the ordinate is the same as previously described. The abscissa, however, is calibrated in real time (months). In FIG. 2 it can be seen that the overall time of the contract is approximately 12 months. The engineering portion being approximately 1.8 months which as illustrated in FIG. 1 is approximately 15 percent of the overall period.

In FIG. 2 it can also be seen that the drafting portion of the contract begins at about the same time that the engineering ends and continues through until about the end of the seventh month whereas the requisition of major equipment begins at about the middle of the second month and continues till about the middle of the third. Likewise purchasing begins in the middle of the second and ends about the beginning of the fifth month and so on for the various phases of the operation. It can be readily seen that the management advisor may utilize the chart or overlay illustrated in FIG. 2 to render a reasonable estimation of the beginning and ending times of a particular job in accordance with the statistical data established by the normalized schedule provided in FIG. 1. It should be understood that each of the individual phases illustrated in FIG. 1 may be shortened or lengthened in accordance with changes in the statistical evaluation of different portions or phases of the contractual obligation. A computer is helpful in this area because these various phases may change as the labor force, etc., changes. Further, different factors for example, inflation and introduction of labor-saving devices may change the length of the individual time required for various phases of the contract. However, assuming that the statistical basis for the individual portions of the obligation are correct and accurate, then the simple method of overlaying a known time period is a rather efficient way of estimating the job scheduling.

Figure 3:
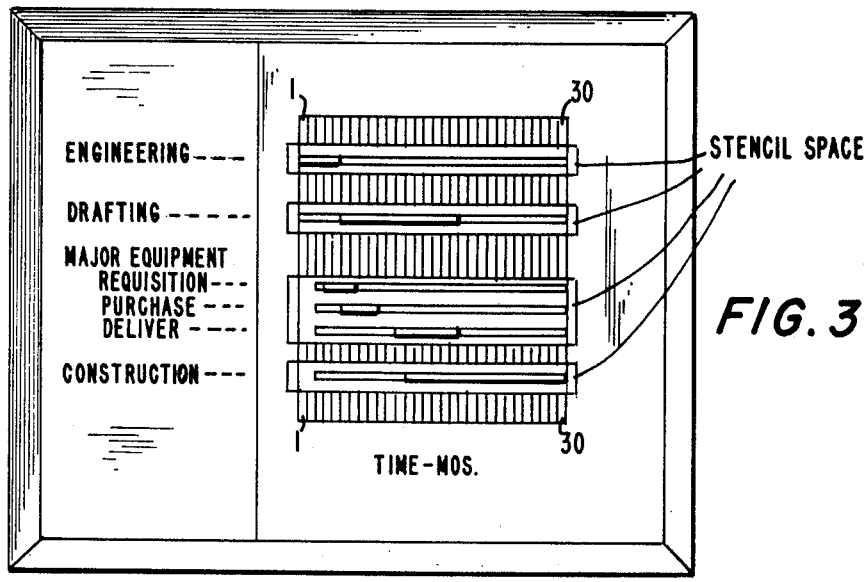
FIG. 3 is a similar illustration of the normalized scheduling means of FIG. 1 with a different overlay for a more extended period of time.

In a similar manner the principles recited with respect to FIGS. 1 and 2 apply to FIG. 3, except that the time period in months is extended. In this particular case a 30 month obligation is illustrated. As can be readily seen from FIG. 3, the engineering portion of the contract will remain as the initial phase of the obligation and continue for about four and one-half months. Contracting begins after about four and one-half months and continues through to about the month 17. Other phases of the particular operation begin at appropriate times in accordance with the schedule for a 30-month contract as illustrated in FIG. 3.

The overlays shown in FIG. 2 and 3 illustrate only two of many which have been developed and are illustrative of the principles involved in the present invention. It can be readily understood that a group of overlays may be drawn up dividing the 0 to 100 normalized period into intervals of real time and cut out with the stencil spaces as illustrated in FIG. 1. In FIGS. 2 and 3, the stencil spaces are labelled appropriately in the drawings so that the individual bars or darkened areas for the particular phase of the operation can be observed. The charts shown in FIGS. 2 and 3 are appropriately drawn up with divisions corresponding with the zero to 100 percentum of the normalized chart of FIG. 1.

Figure 4:
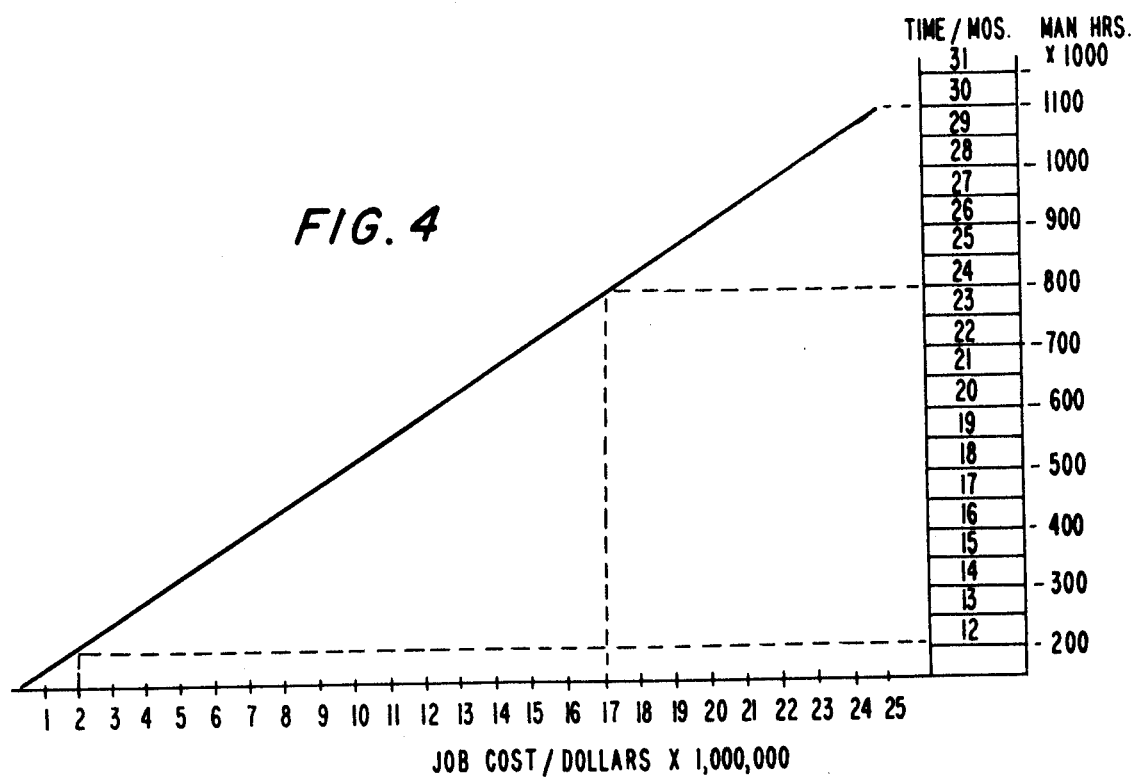
FIG. 4 is a chart illustrating one criteria for determining which of the overlays should be utilized with the normalized chart.

The charts developed for each of the phases of operation are selected in accordance with criteria as illustrated in FIG. 4. The chart is a plot of cost in millions of dollars versus time in months. In the previous illustrations the chart of FIG. 2 corresponds to a two million dollar job (i.e. two million corresponds to 12 months). With respect to FIG. 3, a 25 million dollar job corresponds to about a 30 month obligation.

Other criteria could be used but it has been found that the job cost itself is a reasonable and accurate method for rough estimating of this kind. The drawing also shows the approximate number of man-hours required for a particular job. For a 2 million dollar job about 200,000 man-hours are required, whereas for a 25 million dollar job, about a million plus man-hours are required.

In FIG. 4 there is illustrated a parallel notation of man-hours corresponding to the number of months or alternatively dollars if read with respect to job cost. In any event the number of man-hours can be estimated and placed on the graph or chart as a function of time or cost as required. I.E. A 17 million dollar job, requiring about 24 months of time to complete, would require about 800,000 man-hours. As shall be appreciated later in connection with the manpower allocation apparatus, a total scheduling system has been developed for quick reference. The operator wishing to use the system would, therefore, proceed as follows: determine the estimated cost of the project, refer to the chart of FIG. 4 and obtain a corresponding period of completion, select the overlay (e.g., FIGS. 2, 3, etc.) divided into uniform intervals for the period and placed over the normalized chart of FIG. 1 to determine the scheduling of events. It should be understood that the particular embodiment is illustrative only and other divisions and statistical indicia may be used.

According to the first embodiment of the present invention there has therefor been provided a system for allocating different phases of a contractual obligation with each of a plurality of phases of the contract statistically allocated over a normalized period and conversion of that normalized period to a real-time interval in accordance with a criteria established which has proven reliable. In the particular instance the estimated costs of the job would provide a reasonable approximation of the actual time and man-hour requirements to perform the particular job.

Figure 5:
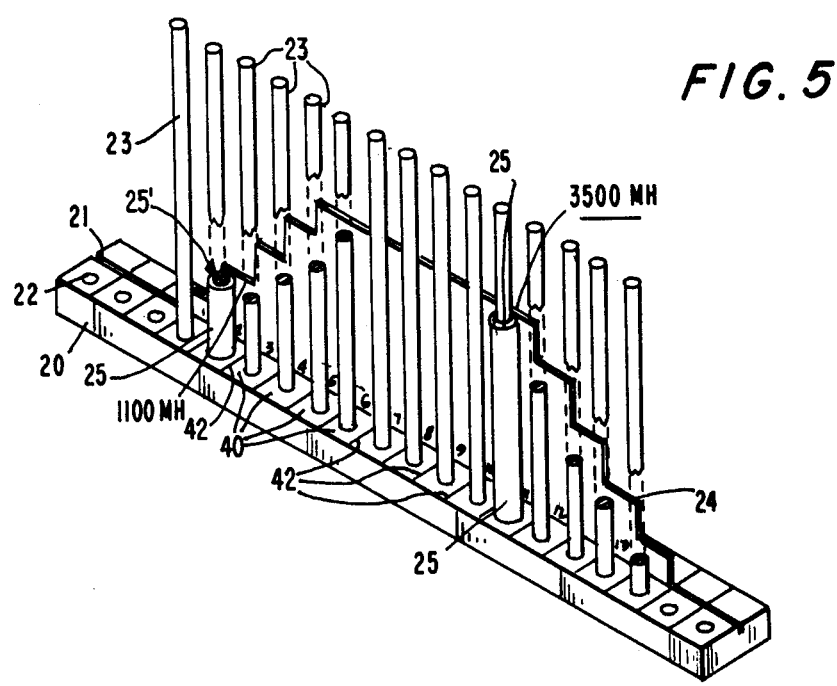
FIG. 5 is a scheduling tool for allocating man-hours for a particular phase of a contractual obligation.

In FIG. 5 there is illustrated a manpower allocation tool which may be used in conjunction with or independently of the scheduling tool previously described. When used together they form a basis for not only scheduling a particular job over the individual contract period but also scheduling other jobs or phases thereof which overlap with existing obligations or those contemplated in the near future during a project.

In FIG. 5 there is shown one element of the scheduling tool with a base 20, a slot 21, and bores 22 evenly disposed along at calibrated intervals 40 defined by lines 42 and pins or receiving means 23. Over the receiving means 23 are placed a plurality of man-hour units measuring means 25', which are cylindrical members or beads with through bores 25', which are adapted to fit over and be received by the receiving means 23. Disposed in the slot 21 is a bar graph element 24 which illustrates the statistical probability of man-hour requirements for a particular job over a selected interval of time. For example, in FIG. 5 there is illustrated the graph card 24 with 10,000 man-hours scheduled for a 14-month duration. These figures may be determined by a computer or by any other suitable means. The numerical quantities may vary in accordance with the requirements of the particular contract. When used in conjunction with the scheduling tool of FIGS. 1-4, the time intervals for the particular phase should correspond with the segments of the bar graph corresponding to the particular phase of operation. In FIG. 5 the man-hour allocation for drafting over a 14-month period and 10,000 man-hours would correspond to a chart used in connection with FIG. 2 for a job having 14 months of drafting (i.e. beginning at percentum 10 and ending at percentum 60). This period obviously can be shortened or lengthened in accordance with the requirements of the particular contract as previously mentioned, but when used in connection with the scheduling tool, the beginning and ending time for a particular phase of operation should correspond.

It can be seen from the drawing that the manpower allocation for a particular job or phase is not uniform over the entire period. This is due naturally to the start up procedures for a particular job beginning slowly levelling off to some uniform work schedule and then again tapering off towards the end of that phase of the job. Numbers may be noted on the top of each of the graphs to indicate man-hours. Alternating in conjunction with numerical indication, a standard rule for a 40 man-hour week can be established with about one-half inch equaling a thousand man-hours. It should be understood however that any convenient scaling procedure can be utilized.

Associated with the scheduling tools shown in FIG. 5 are manpower units measuring means 25 which are scaled to correspond to each of the individual bars of graph members 24. For example, receiving means 23 receive the cylindrical members 25, each having a length so as to correspond with the magnitude of the particular man-hour measurement associated with the receiving means directly associated with the corresponding section of the graph for the particular time interval. For example, in front of month number 11 is a cylindrical measuring means 25 which measures about an inch and a half and corresponds to 3,500 man-hours. Similarly, in front of month 2 is a member 25 measuring just over one inch corresponding to 1,100 man-hours and so on through the 14 month interval represented by the graph. These members are utilized in order to further develop the scheduling as described below.

In FIG. 6 there is shown a number of the scheduling means as illustrated in FIG. 5, however, each are different in that they represent different time intervals and different numbers of man-hours. However, they operate essentially in the same manner as the one illustrated in FIG. 5. The allocating means scheduling elements 20, 32, and 33, are aligned in a base member 30 having alignment members 31 separating each of the individual elements 20, 32, and 33. It should be assumed that element 33 at point A corresponds to month 1 for purposes of explanation. The element 33 with its bar graph 35 inserted in its slot 21 represents the scheduling of man-hours for a particular phase of a contractual obligation. Similarly, element 32 with its bar graph 34 and associated measuring means 25 are situated starting three months later plus three months on the scale shown along rail 31 in the foreground. Finally, element 20 is aligned beginning plus 11 months represented by element 33. The measuring means 25 are transferred to a summing or receiving means 36 as illustrated. Each of the manpower measuring means are color coded to correspond with the particular bar graph from which it was associated. The graph or indicating means 36 in the background therefore shows a summation of all the man-hour units over a relatively long period of time.

It can be seen that at the start up of a particular job very few men are needed, but as work progresses and more jobs are contracted and scheduled, a larger number of individuals are required. It is sometimes possible to reduce the number of men required for a particular job and increase the period over which the operation is performed. This can be done to properly insure that the manpower allocation is fairly uniform. On the other hand, it may be necessary to hire more individuals because of peak periods. This is undesirable, however, because it means consequential layoffs later on when the particular job activity decreases as illustrated by the smaller man-hour units means at the extreme ends of the graph. Another way of allocating the number of men for a particular job is to utilize the somewhat simpler method of increasing the workweek for a particular period of time so that the number of men working remains the same, but with hours increased the effective productivity is increased.

If it turns out that the peak periods are in excess of the normally scheduled number of men that are available for work in a particular department or if it is clear from the scheduling tool that the peak period will exceed what can be expected from individual employees on an overtime basis for example, then it would be necessary to schedule hiring and training of new employees to pick up on this work load as the company itself grows with increased business and productivity.

If the individual job represented by the element 20 in the drawing of FIG. 6 is scheduled to begin at some period of time, for example, 11 months after the beginning of the job represented by element 33, the total schedule allocation of men represented at locating means 38 would be fairly certain for the next year or so. When another job is scheduled then the locating means 38 is thereafter modified to reflect the current status of contractual obligations. On the other hand, if it is possible to reschedule the job represented by element 20, the tool 20 may be either moved to the left or right and the corresponding manpower allocating measuring means may be moved from the receiving means to adjacent pins as required to reflect the new schedule. The bar graphs representing the particular jobs for contractual obligations represented in FIG. 6 may be chosen from a statistically determined manually calculated or computer print out showing the allocation of men over a particular period of time. The advantage of the present system is that these particular bar graphs may be interchanged with others when the man-hour totals or duration are changed so that a whole catalogue of schedules for individual jobs may be stored and utilized in this tool as required by management personnel. Manpower level markers illustrated in FIGS. 7A, 7B, 7C and 7D may be appropriately placed adjacent locating means 37 to indicate the maximum number of men available for a particular job so that the available personnel are always known with respect to the contractual obligations actual or anticipated.

In FIGS. 7A, 7B, 7C and 7D there is shown scale drawings for manpower level markers for quickly estimating what variations in the workweek are possible as an alternative to hiring new personnel when such hiring is wasteful of resources. A change in work schedule would accomplish a peak shaving of these periods where extra personnel are needed. The first scale 7A shows hours per month in thousands of hours with approximately one-half inch representing one thousand man-hours. Scales 7B, 7C, and 7D illustrate respective scales representing the number of men required to accomplish a corresponding number of hours a month on a 40-hour work schedule, 45 hours per week and a 50-hour week respectively. It can be seen, therefore, that by utilizing the scales and placing the scale adjacent the particular summation on one of the locating means 37 (FIG. 6), a determination can be made as to how many men are required on a 40-hour week to accomplish the work required for that month. On the other hand, the difference between the number of men available and that required are few, the workweek can be changed by utilizing the scale for a 45-hour week to determine how many men would be required under those circumstances. It can be readily seen that the difference may be as little as 10 percent of the work force. On the other hand, if this difference is excessive, overtime for long periods becomes unproductive. This is a good indication that the organization needs to be enlarged to effect greater productivity.

The tools illustrated in the drawings described herein provide a system for job scheduling and manpower allocation with variations in accordance with available personnel for a particular contractual obligation or in accordance with different phases thereof.

The drawing illustrated in FIG. 6 has been discussed in terms of three individual jobs, namely those represented by elements 20, 32 and 33. For example, all of the drafting or purchasing or accounting personnel may be grouped for a particular job in the manner illustrated by FIG. 6. On the other hand, the tool illustrated in FIG. 6 may be utilized to coordinate the manpower allocation with the overall scheduling of a particular individual job as is scheduled in accordance with the scheduling apparatus described with respect to FIGS. 1 through 4. In any event, the use of the tool should not be limited to one particular application since variations on its use are quite evident.

While there has been described what is presently considered to be the preferred embodiment of the present invention, it will be obvious to those skilled in the art that various changes and modifications may be made therein without departing from the invention and it is intended in the appended claims to cover all such changes and modifications that fall within the true spirit and scope of the invention.

What is claimed is:

1. A scheduling tool for establishing an allocation of manpower during a project in which there is a plurality of phases comprising:
   a plurality of scheduling elements;
   a plurality of receiving means on each scheduling element, each pair of adjacent receiving means being spaced apart the same distance;
   a plurality of manpower measuring means, each being adapted to be mounted on one of said receiving means so that it projects in a direction perpendicular to said scheduling element, said manpower measuring means being adapted to be positioned end to end so that several manpower measuring means are mounted on each of said scheduling elements by several of said receiving means;
   a plurality of graph cards, each indicating the manpower requirements against time as a product of persons used and unit of time for a particular phase of said project;
   said graph cards being adapted to be mounted each on one of said scheduling elements so that the representation of time is in intervals, each of which is represented linearly a distance equal to said distance between each of said receiving means;
   indicating means including a plurality of locating means, each of said locating means adapted to secure a plurality of manpower measuring means end to end; and
   a manpower level marker for measuring the length of a number of manpower measuring means positioned end to end and indicating the total as a product of the persons employed and units of time of the manpower represented by said number of manpower measuring means;
   whereby when each one of said plurality of graph cards indicating manpower requirements for a particular phase is mounted on one of said scheduling elements and the plurality of scheduling elements are then aligned so that each graph indicates a duration of a phase and is positioned to indicate a span of time in relation to the duration of the project and said receiving means, representing the same interval of time during said project are in straight alignment so that manpower measuring means can be positioned on said receiving means to the height of said graph card and the manpower measuring means on aligned receiving means can be secured end to end on a locating means to be measured by said manpower level marker and thereby indicate the manpower requirements for a particular interval.

2. The scheduling tool of claim 1 wherein said plurality of receiving means is a plurality of parallel pins arranged in substantially a straight line.

3. The scheduling tool of claim 2 wherein said plurality of manpower measuring means is a plurality of beads, each with a through bore so that each of said manpower measuring means can be mounted on one of said pins with said one pin extending through a through bore.

4. The scheduling tool of claim 3 wherein said scheduling element has a slot extending parallel to said straight line and adapted to receive the edge of a graph card.

5. The scheduling tool defined in claim 4 wherein said beads and said graph cards are color coded.

6. The scheduling tool of claim 1 further comprising a base member, a plurality of elongated parallel alignment members on the top of said base member so that said scheduling elements can be positioned between said alignment members and moved therebetween.

7. The scheduling tool of claim 1 wherein said plurality of locating means is a plurality of parallel pins mounted on said indicating means.

8. The scheduling tool defined in claim 7 wherein said indicating means has a slot for receiving a graph card.

* * * * *